Dec. 26, 1933.                H. E. LINES                 1,941,310
                         THERMOSTATIC SWITCH
                          Filed May 16, 1933

Inventor:
Henry E. Lines,
by Charles E. Mullan
His Attorney.

Patented Dec. 26, 1933

1,941,310

UNITED STATES PATENT OFFICE 1,941,310

THERMOSTATIC SWITCH

Henry E. Lines, Ponders End, England, assignor to General Electric Company, a corporation of New York Application May 16, 1933, Serial No. 671,411, and in Great Britain May 9, 1932

3 Claims. (Cl. 200—137)

This invention relates to thermostatic switches and the like, more particularly to thermostatic switches for automatically controlling the operation of domestic cooking utensils and the like, such as electrically heated kettles or like devices, and it has for its object the provision of an improved switch of this character.

In accordance with this invention, the switch is dependent for its operation upon the movement due to thermal expansion and contraction of some part of the utensil or device that the switch controls. In one form of the invention, a suitable switch actuating arm is mechanically associated with a wall of the utensil, preferably the bottom wall, so as to be actuated by the thermal expansion and contraction of the wall to open and close the heating circuit of the utensil.

Figure 1:
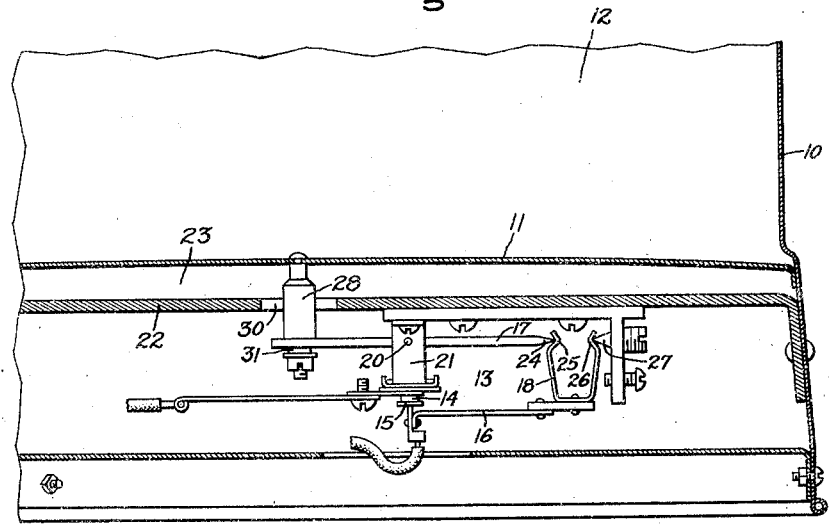
Figure 2:
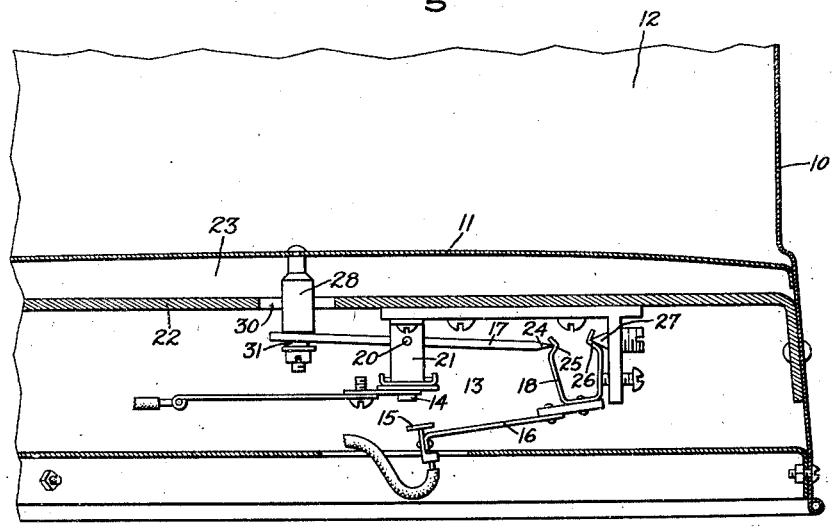

For a more complete understanding of the invention, reference should be had to the accompanying drawing in which Fig. 1 is a fragmentary view in section of an electrically heated kettle provided with a thermostatic controlling switch arranged in accordance with this invention; and Fig. 2 is a view similar to Fig. 1, but showing certain elements of the switch in different operative positions than shown in Fig. 1.

Referring to the drawing, the invention is shown as applied to an electrically heated kettle having side walls 10 and a bottom wall 11 forming a receptacle 12 for receiving the material to be heated. The side walls 10, as shown, extend below the bottom wall 11 so as to form a base for the kettle.

Heat is applied to the contents of the receptacle 12 by any suitable electrical heating element (not shown). This element may apply heat directly to either the side walls, or to the bottom wall, or to both of these wall portions, or an electrical heating element of the immersion type may be used. As the particular form of heating means forms no part of this invention, it has been deemed unnecessary to disclose its specific details of construction.

The heating circuit is controlled by means of a switch 13 having a fixed contact 14 and a movable contact 15 cooperating with the fixed contact so that when these contacts are in engagement, as shown in Fig. 1, the heating circuit will be closed to apply heat to the kettle, whereas when the contacts are separated, as shown in Fig. 2, the heating circuit will be interrupted to shut off the heat.

The contact 15 is carried by a contact arm 16. This arm 16 is arranged to be operated by means of a pivotally mounted lever 17, which actuates the arm through the medium of an inverted U-shaped spring member 18. The arm 16, as shown, is rigidly secured to the base of this U-member.

The lever 17, as shown, is pivotally mounted intermediate its ends on a suitable shaft or pin 20, which is mounted on a standard or support 21. This support 21 in turn is secured to a plate-like supporting member 22 secured to the side walls 10 below the bottom wall 11 so as to provide a small space 23 between the bottom wall and the supporting plate.

The right hand end of the lever 17, as viewed in the figure, is provided with a knife-edge bearing 24 which rests in a seat 25 provided for it in one arm of the spring member 18, the other arm of which is provided with a similar seat 26 which rests on a fixed knife-edge bearing 27.

The other end of the arm 17 is secured to the bottom wall 11 of the receptacle 12 so that the arm is operated to open and close the switch 13 responsively to the movement of this wall due to its thermal expansion and contraction. For this purpose, a stud 28 is rigidly secured to the bottom wall 11. This stud extends downwardly through an aperture 30 provided for it in the support 22, and has its lower end connected with the lever 17.

This lower end of the stud has a reduced section 31 which is received in an aperture (not shown) provided for it in the lever 17.

The bottom wall 11 to which the stud 28 is connected is domed upwardly somewhat, as shown in the figures.

In operation, when the switch is in its closed position shown in Fig. 1, the heating circuit will be closed so that heat will be imparted to the liquid in the vessel 12. If the liquid in the vessel 12 evaporates so that the bottom 11 is uncovered, the bottom will become overheated and expand so as to move upwardly. This movement operates the lever 17 in a clockwise direction so as to move the switch to its open-circuit position, shown in Fig. 2, to cut off the heat. On cooling down, the wall 11 contracts so as to reclose the switch. The switch will remain closed until the wall 11 is again heated up to the temperature at which the expansion of the wall again causes it to open.

It will be understood that the U-shaped spring member 18 functions to snap the switch contact 15 quickly between its open and closed positions.

It will also be understood that the temperature at which the switch is set to open is lower than that at which the utensil would be permanently damaged.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In an electrically heated utensil and the like provided with a wall that expands and contracts when heated and cooled, a switch controlling the heating circuit of said utensil, a pivoted arm arranged to operate said switch between its open and closed positions, means connecting said arm to said wall so that said arm is moved to operate said switch to open and close by thermal expansion and contraction of said wall and resilient means cooperating with said arm to cause said arm to snap quickly between its switch controlling positions.

2. A thermostatic switch for an electrically heated utensil and the like comprising a pivoted bar, means securing one end of said bar to a wall portion of said utensil so that said bar is moved by the thermal expansion and contraction of said portion, a fixed pivot bearing adjacent the other end of said bar, a resilient member bearing on said fixed pivot and the end of said bar adjacent the fixed pivot and a switch contact arm operated by said bar.

3. A thermostatic switch for an electrically heated utensil and the like comprising a pivoted bar, means securing one end of said bar to a wall portion of said utensil so that said bar is moved by the thermal expansion and contraction of said portion, a fixed pivot bearing adjacent the other end of said bar, a U-shaped spring member having one arm bearing on said fixed pivot and its other arm bearing on the adjacent end of said pivoted bar and a switch contact arm carried by said U-shaped member.

HENRY E. LINES.